US012705431B2

(12) United States Patent
Agarwal et al.

(10) Patent No.: US 12,705,431 B2
(45) Date of Patent: Aug. 11, 2026

(54) COMPUTER-IMPLEMENTED SYSTEMS CONFIGURED FOR AUTOMATED ELECTRONIC MESSAGE ADMINISTRATION AND METHODS OF USE THEREOF

(71) Applicant: Celligence International LLC, Guaynabo, PR (US)

(72) Inventors: Pavan Agarwal, Dorado, PR (US); Gabriel Albors Sanchez, San Juan, PR (US); Jonathan Ortiz Rivera, San Juan, PR (US); Jennifer Vallinayagam, Guaynabo, PR (US)

(73) Assignee: Celligence International LLC, Guaynabo, PR (US)

( * ) Notice: Subject to any disclaimer, the term of this patent is extended or adjusted under 35 U.S.C. 154(b) by 56 days.

(21) Appl. No.: 18/745,982

(22) Filed: Jun. 17, 2024

(65) Prior Publication Data

US 2024/0419916 A1 Dec. 19, 2024

Related U.S. Application Data

(60) Provisional application No. 63/521,576, filed on Jun. 16, 2023.

(51) Int. Cl.
*G06F 40/35* (2020.01)
*H04M 3/523* (2006.01)

(52) U.S. Cl.
CPC ............. *G06F 40/35* (2020.01); *H04M 3/523* (2013.01)

(58) Field of Classification Search
CPC ....................................................... G06F 40/35
USPC ............................................................. 704/9
See application file for complete search history.

(56) References Cited

U.S. PATENT DOCUMENTS

| | | | | |
|---|---|---|---|---|
| 10,990,760 | B1 | 4/2021 | Monnett et al. | |
| 11,954,443 | B1 * | 4/2024 | Kumar | G06N 3/044 |
| 2017/0344344 | A1 * | 11/2017 | Gass | G06F 9/44526 |
| 2018/0211260 | A1 | 7/2018 | Zhang et al. | |
| 2019/0227822 | A1 * | 7/2019 | Azmoon | G06F 40/186 |
| 2020/0258013 | A1 * | 8/2020 | Monnett | H04L 41/5074 |
| 2021/0344636 | A1 * | 11/2021 | Martin | G06N 5/041 |
| 2021/0349433 | A1 | 11/2021 | Zweig et al. | |
| 2022/0046129 | A1 | 2/2022 | Clodore et al. | |
| 2023/0117113 | A1 * | 4/2023 | Rubens | G06Q 30/015 379/265.13 |

OTHER PUBLICATIONS

PCT International Search Report and the Written Opinion mailed Sep. 11, 2024, issued in related International Application No. PCT/US2024/034408 (8 pages).

* cited by examiner

*Primary Examiner* — Yulin Sun
(74) *Attorney, Agent, or Firm* — Sheppard Mullin Richter & Hampton LLP

(57) ABSTRACT

Systems and methods are provided for facilitating automated administration of email messages received by a customer service representative including a service email administrator system that reviews incoming email messages, analyzes the content, assesses emotional sentiment, urgency, and determines the best course of action. The conversation administrator is configured to use natural language processing and machine learning algorithms to generate automated responses, provide email response drafts for customer service representative (CSR) review, or route emails to CSRs based on the sentiment or urgency.

21 Claims, 13 Drawing Sheets

Lambda Final Testing 8754p - Attachment

Hi Team,

Please find a test email with attachments.

Sub: Lambda Final Testing 8754p - Attachment

...

Thanks & Regards,

Krunal Modi
Providing Software Engineering Services for
Sun West Mortgage Company, Inc. (NMLS ID: 3277)
Toll-Free: (800) 453-7884 (Ext # 7306)
E-Mail: krunal.modi@swmc.com
www.swmc.com 3 Attachments • Scanned by Gmail

COMPUTER-IMPLEMENTED SYSTEMS CONFIGURED FOR AUTOMATED ELECTRONIC MESSAGE ADMINISTRATION AND METHODS OF USE THEREOF

RELATED APPLICATIONS

This application claims the benefit of U.S. Provisional Application No. 63/521,576 filed on Jun. 16, 2023, the contents of which are incorporated herein by reference in its entirety.

TECHNICAL FIELD

The present disclosure generally relates to improved computer-based systems devices, components and objects configured for automated administration of electronic messaging and methods of use thereof.

BACKGROUND

Customer support is a critical component of any business, serving as the primary interface between the company and its customers. Efficient and effective handling of customer inquiries, complaints, and requests is essential for maintaining customer satisfaction and loyalty. Traditional methods of managing customer support emails often involve manual sorting and routing of incoming messages by customer service representatives. This process is not only time-consuming and prone to human error but also delays response times, which can negatively impact customer experience.

With the advent of advanced technologies in natural language processing (NLP), machine learning (ML), and artificial intelligence (AI), there is a significant opportunity to enhance and automate the email routing process. Automatic routing of customer support emails can streamline operations, reduce response times, and ensure that inquiries are directed to the most appropriate support personnel or department.

Several existing solutions attempt to address this need by using rule-based systems or keyword matching techniques. However, these methods often fall short in handling the complexity and variability of customer emails. For instance, rule-based systems may struggle with emails that do not follow a predictable pattern or contain ambiguous language. Keyword matching can lead to misclassification if the keywords are not accurately representative of the email's content or context.

Moreover, current systems generally fail to consider the emotional tone of customer emails, which can be crucial in assigning the urgency and appropriate handling of a support request. An email expressing frustration or anger may need to be prioritized and routed to a senior support agent, while a routine inquiry can be handled through standard procedures. Ignoring the emotional tone can result in inadequate responses, further aggravating dissatisfied customers and potentially escalating issues.

The present invention aims to overcome these limitations by leveraging advanced NLP and ML techniques to automatically analyze and classify customer support emails. This system not only intelligently routes emails based on their content, context, and urgency but also incorporates sentiment analysis to gauge the emotional tone of each email. By assessing the emotional state of the customer—whether it be anger, frustration, satisfaction, or urgency—the system can prioritize and route emails accordingly, ensuring that each inquiry receives the most suitable and timely response.

The invention also incorporates continuous learning mechanisms to adapt to evolving customer language and emerging issues, thereby improving accuracy and efficiency over time. By considering both the semantic content and emotional tone of customer emails, this system provides a more nuanced and effective approach to email routing.

By implementing this innovative approach, businesses can enhance their customer support capabilities, leading to improved customer satisfaction, operational efficiency, and overall effectiveness of the support process. The automated email routing system described herein represents a significant advancement in the field of customer service technology, offering a robust solution to the challenges faced by contemporary customer support operations.

SUMMARY

In accordance with one or more embodiments, various features and functionality can be provided to enable or otherwise facilitate automated administration of customer email messages sent to a customer service representative.

In some embodiments, a customer service email administrator system may provide an automated customer service email solution that reviews incoming emails, analyzes the content, assesses emotional sentiment, assigns urgency, and determines the best course of action. For example, the system may generate automated responses, provide drafts for customer service representative (CSR) review, or route emails to CSRs based on the sentiment or urgency.

In some embodiments, the customer service email administrator system may use natural language processing and machine learning algorithms to analyze and interpret an email communication received from a customer. The system may utilize NLP to understand user input content and context, may classify user input based on subject matter and urgency (e.g., identify keywords and phrases that indicate the urgency of the input), may classify emails based on subject matter and determine the appropriate response category, may extract and analyze any applicable behavior data, e.g., including keystroke rate (e.g., how fast the user is typing), time between keystrokes (e.g., words correlated with user's pausing may be indicative of anxiety). Further, the customer service email administrator system may analyzes the emotional tone of the user input to sender's emotional state based on the determined textual input. In some embodiments, the response component reviews incoming emails and determines the appropriate response based on the content, urgency, and emotional state of the sender.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

DETAILED DESCRIPTION

Figure 1:
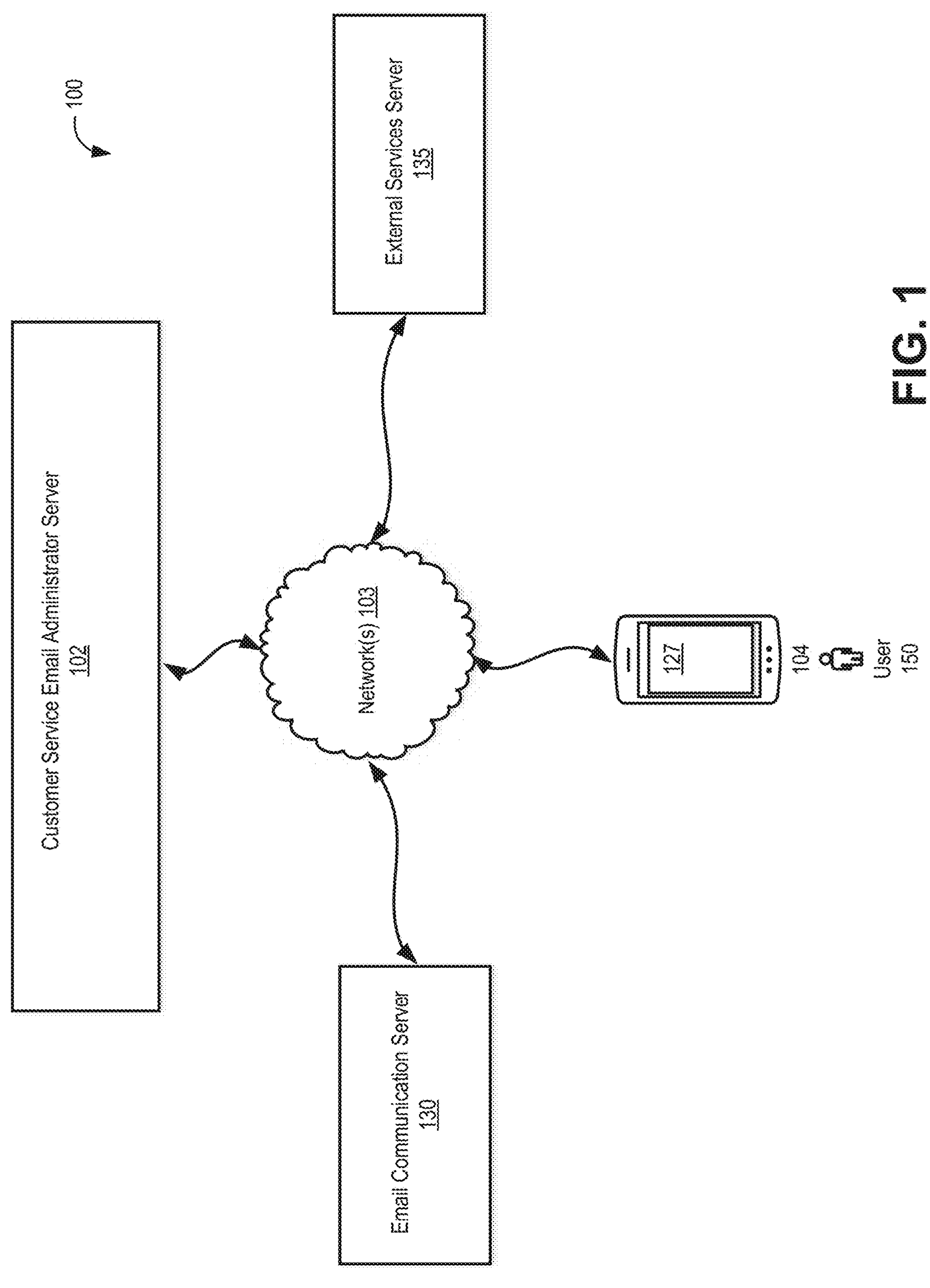
FIG. 1 illustrates example system an example overview of a customer service email administrator system, according to an implementation of the disclosure.

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein.

In some embodiments, a customer service email administrator system may provide an automated customer service email solution that reviews incoming emails, analyzes the content, in terms of emotional sentiment, urgency, and determines the best course of action. For example, the system may generate automated responses, provide drafts for customer service representative (CSR) review, or route emails to CSRs based on the sentiment or urgency. Customer service departments often face high volumes of email inquiries, which can lead to delays in response times and inconsistent service quality. Traditional email management systems lack the sophistication to analyze the content and emotional tone of emails effectively. There is a need for an advanced solution that can prioritize emails, generate appropriate responses, and route them to human representatives when necessary, thereby improving efficiency and customer satisfaction.

Described herein are systems and methods for an automated customer service email administrator system that can manage customer service inquiries. As discussed above, existing systems fail to analyze the content and emotional tone of emails effectively, leading to increased response time, improper response, and customer dissatisfaction. The automated customer service email administrator addresses these limitation by providing a robust framework for handling various customer inquiries.

There is a need for an advanced solution that can prioritize emails, generate appropriate responses, and route them to human representatives when necessary, thereby improving efficiency and customer satisfaction. The system includes components for user recognition, context management, natural language understanding (NLU), urgency determination, and response generation. This enables the customer service administrator to provide automated response to customers or provide customer service representatives with prioritized customer emails and pre-generated response for review. Accordingly, this system reduces the workload on customer service teams and ensures timely and appropriate responses to customer inquiries.

In some embodiments, the automated customer service email solution may comprise a virtual assistant program ("VA") that utilizes artificial intelligence and natural language processing to provide assistance to customer service representatives by generating automated responses to customer inquiries, providing drafts for CSR review, or routing emails to CSRs based on the sentiment or urgency. The following embodiments provide technical solutions or technical improvements that overcome technical problems, drawbacks or deficiencies in the technical fields involving, consolidation, standardization, and review of data from disparate data sources, automatic identification of users' emotional state and generating a response in the context of the determined emotional state in a robust, accurate and efficient manner to improve the performance and accuracy of the assistance provided by a VA application, among others. The emotional state may be identified using a composite model comprising one or more semantic models to generate an assessment of the emotional state. In some embodiments, this process leverages machine learning, natural language processing (NLP), and other AI techniques to interpret and evaluate various forms of data related to a users' behavior, expressions, and interactions. In some embodiments, the behavior may include keystroke rate, (e.g., how fast the user is typing), time between keystrokes (e.g., where the user chooses to pause when typing).

In some embodiments, the customer service system may be integrated with email applications, including but not limited to Google Gmail, Apple Mail, Microsoft Outlook, among other email programs and services. For example, a user the user (e.g., a customer service representative) may choose to carbon-copy (CC) an email address monitored by the customer service system as a recipient of all incoming and outgoing emails addressed to the user. By analyzing the corpus of user's correspondence, the system learns from the user's email interactions to identify response patterns and priorities. This enables the system to generate and send automated responses tailored to the user's communication style and preferences, thereby improving email efficiency and reducing the user's workload. The system may generate contextually appropriate responses, which can be sent automatically or presented to the user for approval. The system aims to reduce the user's email management burden and enhance productivity.

In some embodiments, the automated customer service email administrator system may be integrated with a web-based platform to facilitate real-time chat-based assistance between a human user and an expert human assistant. The system manages the interaction by routing queries, providing preliminary information, and learning from the exchanges to improve future assistance by applying machine learning techniques according to certain example embodiments described herein. This system enhances the efficiency of obtaining expert advice while reducing the workload on human assistants.

In some embodiments, the customer service email administrator system may be integrated with existing mobile messaging applications (e.g., WhatsApp, Telegram, Facebook Messenger, and so on), communication applications, including email, as well as external platforms web-based platforms. By allowing the presently disclosed VA to seamlessly integrate with existing messaging or communication platforms allows the VA not only to assist a greater number of participants, it also removes the need for running any superfluous instances of VA software thereby optimizing systems resources. Furthermore, when VA is invited into a group conversation, it can perform a variety of tasks that are simply not possible in a single user setting. For instance, the VA of customer service administrator may respond to user questions and comments, provide support and guidance as needed, resolve disputes between participants, act in a mediator or counselor capacity, as will be described in more detailed herein.

Moreover, various practical applications of the disclosed technology are also described, which provide further practical benefits to users and operators that are also new and useful improvements in the art.

FIG. 1 illustrates an example automated customer service email administrator system 100 for providing an automated customer service email solution that reviews incoming emails, analyzes the content, urgency, and emotional sentiment, and determines the best course of action, in accordance with the embodiments disclosed herein. In some embodiments, the system 100 may provide an For example, the system 100 may analyze customer emails and an either generate automated response, provide a draft for review, or route the email to a customer service representative (CSR) based on the determined priority. This system may be configured to enhance efficiency, improve customer satisfaction, and reduce the workload on customer service teams.

In some embodiments, system 100 may include an automated customer service email administrator server 102 in communication with one or more network(s) 103. The system 100 may also include one or more email communication services server 130, one or more external services server 135, and a client computing device 104, that are in communication with network 103. A user 150 may be associated with a client computing device 104. The user 150 may include a customer service representatives configured to respond to customer inquiries. For example, customers applying for a mortgage may send a message asking for an update on their loan status to the mortgage company. The messages may be viewed and attended to by a representative 150 of the mortgage company.

In some embodiments, users of system 100 (e.g., customer service representatives) may access the system 100 via client computing device(s) 104. In some embodiments, the various below-described components of FIG. 1 may be used to initiate application 127 within client computing device 104. In some embodiments, application 167 may be configured to display a set of customer emails that require input from customer service representatives 150.

In some embodiments and as will be described in detail in FIG. 2, automated customer service email administrator server 102 may include a processor, a memory, and network communication capabilities. In some embodiments, automated customer service email administrator server 102 may be a hardware server. In some implementations, automated customer service email administrator server 102 may be provided in a virtualized environment, e.g., automated customer service email administrator server 102 may be a virtual machine that is executed on a hardware server that may include one or more other virtual machines. Automated customer service email administrator server 102 may be communicatively coupled to a network 103. In some embodiments, automated customer service email administrator server 102 may transmit and receive information to and from client computing device 104, email communication services server 130, one or more external services servers 135, and/or other servers via network 103.

Figure 2:
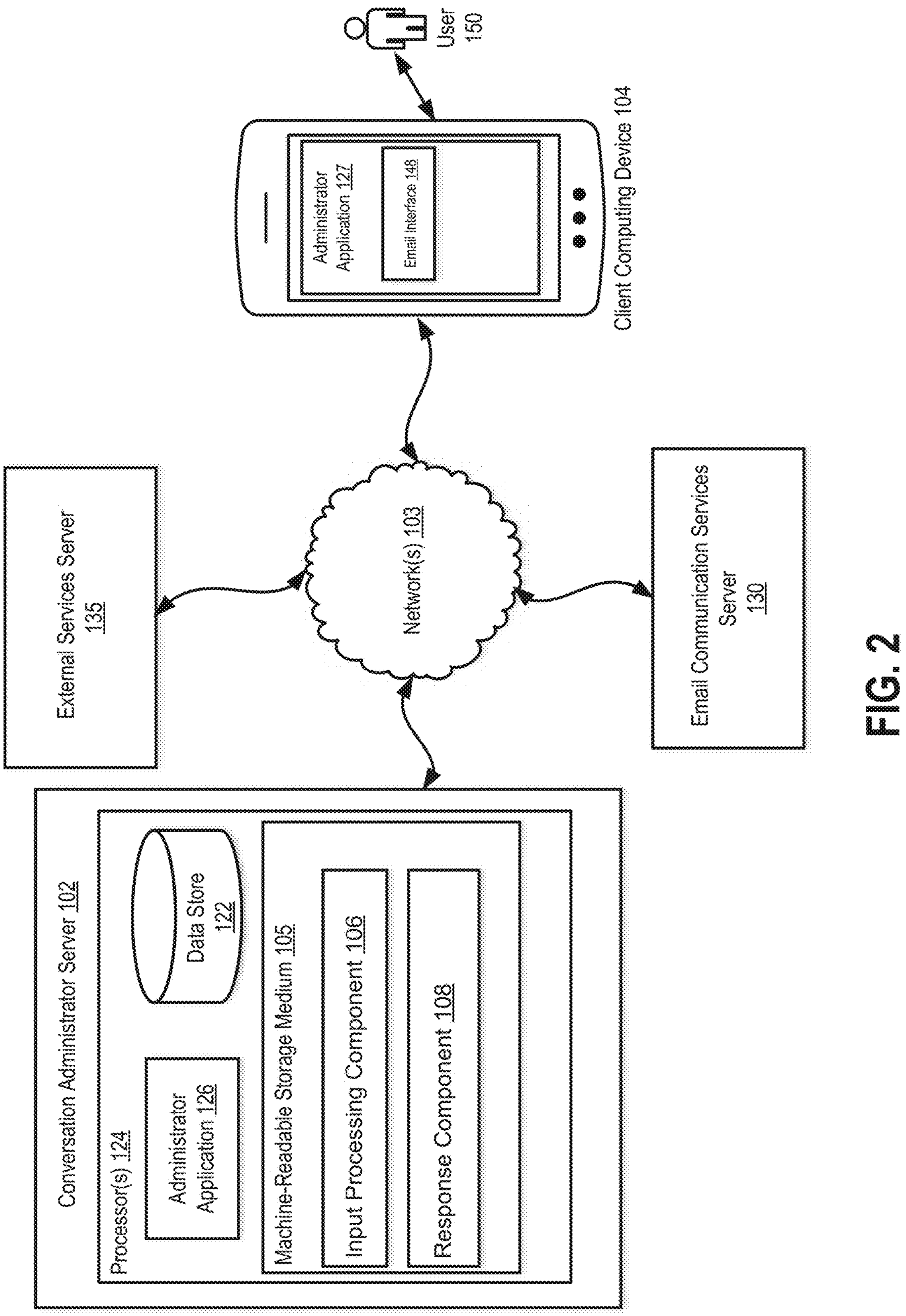
FIG. 2 illustrates an exemplary schematic diagram of a computer-based architecture of an exemplary apparatus of the customer service email administrator system of FIG. 1, according to an implementation of the disclosure.

As illustrated in FIG. 2, automated customer service email administrator server 102 may comprise computer program components operable by the processor to enable automatic customer message administration. In some embodiments, automated customer service email administrator server 102 may comprise computer program components operable by the processor to enable a virtual customer service assistant provided by application 127.

In some embodiments, one or more external services servers 135 may be used by automated customer service email administrator server 102 to implement chat assistant services, including human expert services, bot services, and/or other similar services as described in further detail below.

In some embodiments, one or more external services server 135 may include one or more processors, memory and network communication capabilities (not shown). In some embodiments, external services server 135 may be a hardware server connected to network 103, using wired connections, such as Ethernet, coaxial cable, fiber-optic cable, etc., or wireless connections, such as Wi-Fi, Bluetooth, or other wireless technology. In some embodiments, external services server 135 may transmit data between one or more of the automated customer service email administrator server 102 and client computing device 104 via network 103. In some embodiments, external services server 135 may be managed by the same party that manages automated customer service email administrator server 102. In other embodiments, external services server 135 may a be third-party server, e.g., controlled by a party different from the party that provides the conversation administrator (i.e., automated customer service email administrator server 102).

In some embodiments, client computing device 104 may include a variety of electronic computing devices, such as, for example, a smartphone, tablet, laptop, computer, wearable device, television, virtual reality device, augmented reality device, displays, connected home device, Internet of Things (IoT) device, an enhanced general packet radio service (EGPRS) mobile phone, a media player, a navigation device, a game console, a television, a remote control, or a combination of any two or more of these data processing devices, and/or other devices. In some embodiments, client computing device 104 may present content to user 150 and receive customer message input. In some embodiments, client computing device 104 may parse, classify, and otherwise process customer message input. For example, client computing device 104 may store customer message input including commands for initiating client conversation administrator application 127, as will be described in detail below.

In some embodiments, client computing device 104 may be equipped with GPS location tracking and may transmit geolocation information via a wireless link and network 103. In some embodiments, automated customer service email administrator server 102, including conversation administrator application 127, and email communication services server 130, may use the geolocation information to determine a geographic location associated with user 150. In some embodiments, automated customer service email administrator server 102 and/or email communication services server 130 may use signal transmitted by client computing device 104 to determine the geolocation of user 150 based on one or more of signal strength, GPS, cell tower triangulation, Wi-Fi location, or other input.

In some embodiments, email communication services server 130 may include one or more processors, memory and network communication capabilities. In some embodiments, email communication services server 130 may be a hardware server connected to network 103, using wired connections, such as Ethernet, coaxial cable, fiber-optic cable, etc., or wireless connections, such as Wi-Fi, Bluetooth, or other wireless technology. In some embodiments, email communication services server 130 may transmit data between one or more of automated customer service email administrator server 102, client computing device 104, and/or other components via network 103. In some embodiments, a standard API can be used between components of automated customer service email administrator server 102, external services server 135, email communication server 130 and/or application 127.

FIG. 2 illustrates an example automated customer service email administrator server 102 configured in accordance with one embodiment. Processor(s) 124 may be one or more central processing units (CPUs), semiconductor-based microprocessors, and/or other hardware devices suitable for retrieval and execution of instructions 106-108 stored in machine-readable storage medium 105. Processor(s) 124 may fetch, decode, and execute instructions to control processes or operations for optimizing the system during run-time. As an alternative or in addition to retrieving and executing instructions, processor(s) 124 may include one or more electronic circuits that include electronic components for performing the functionality of one or more instructions, such as a field programmable gate array (FPGA), application specific integrated circuit (ASIC), or other electronic circuits.

A computer readable storage medium, such as machine-readable storage medium 105 may be any electronic, magnetic, optical, or other physical storage device that contains or stores executable instructions. Thus, machine-readable storage medium 105 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 105 may be a non-transitory storage medium, where the term "non-transitory" does not encompass transitory propagating signals. As described in detail below, machine-readable storage medium 105 may be encoded with executable instructions, for example, instructions 106-108, and/or for running various processes and engines described throughout the disclosure.

In some embodiments, as alluded to above, automated customer service email administrator server 102 may include a distributed application 126 and a corresponding client conversation application 127 running on client computing device 104.

The corresponding client conversation administrator application 127 may be configured to provide client functionality to enable a customer service representative 150 to review messages routed for review via an interface 148 provided on client computing devices 104. In some embodiments, distributed conversation administration application 126 may be operable by one or more processor(s) 124 configured to execute computer readable instructions 105 comprising applications, engines, or modules, including computer program components. In some embodiments, the computer program components may include one or more of an input processing component 106, and a response generation component 108, and/or other such components.

Figure 3:
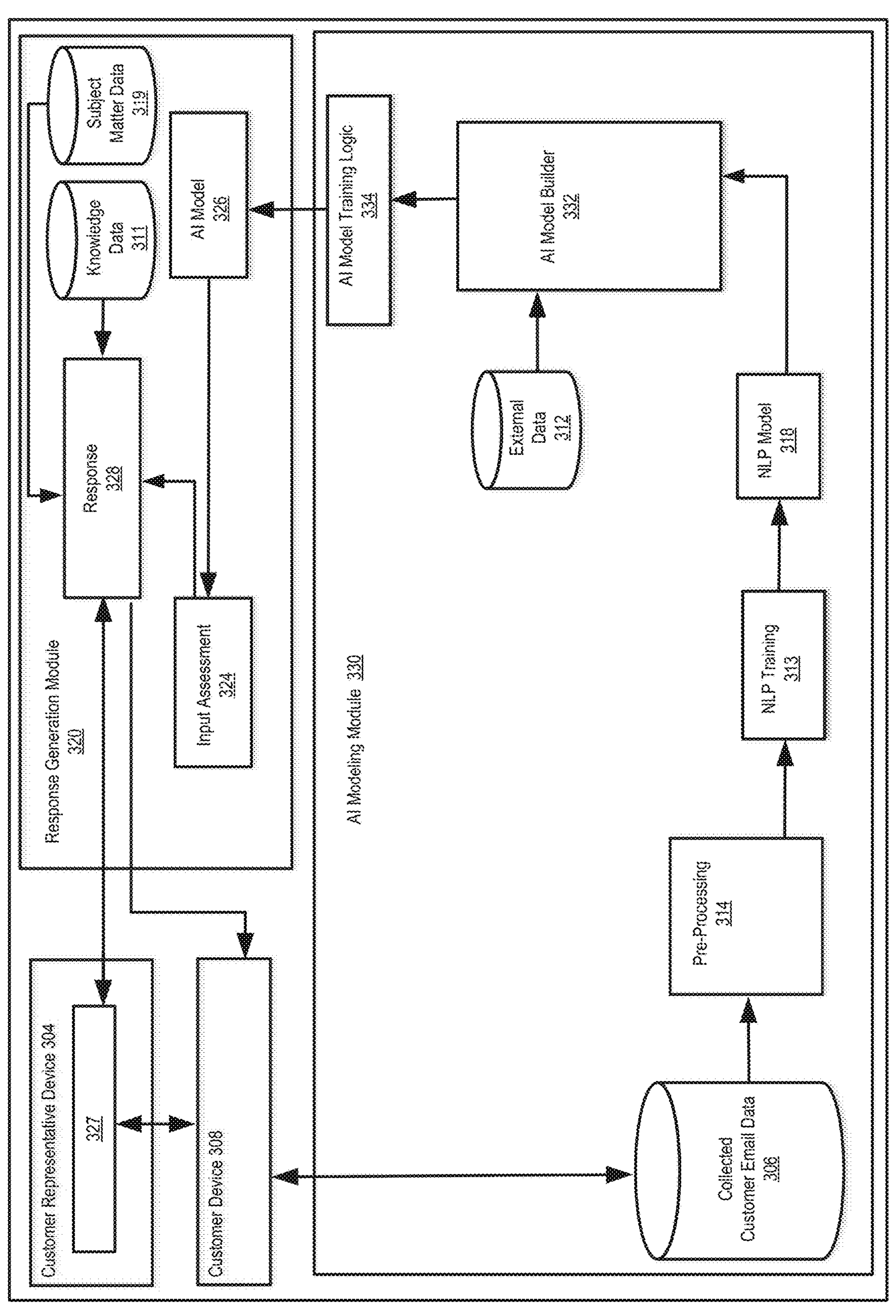
FIG. 3 illustrates a schematic diagram of assistant AI modeling module and response generation module of the customer service email administrator system of FIG. 1 in greater detail, including a general flow of data, according to an implementation of the disclosure.

Having now described an example apparatus for implementing example embodiments, FIG. 3 is a flowchart illustrating example operations of an apparatus 102, according to some example embodiments. The operations of FIG. 3 may be performed by apparatus 102, such as with the automated customer service email administrator system 100 and/or the like.

As shown in FIG. 3, automated customer service email administrator system (system 100 illustrated in FIG. 1) includes an AI modeling module 330, a response generation module 320, administrator application 327 (e.g., 127 illustrated in FIG. 1) associated with a user computing device 304, and a customer device 108.

AI modeling module 330 is a server computer system that combines a number of machine learning models 332 into a trained model 334 to produce a model 326 using user data collected from previously assisted user interactions from data server and/or database 306. In some embodiments, the AI modeling module 330 receives data from multiple data sources related to analyzing customer message input and determining the response. This data may include, e.g., previously collected customer email data, customer profile data, including personal preferences, interaction history, contextual information (e.g., location, device usage), customer biometric identification (e.g., voice recognition, facial recognition). In some embodiments, AI modeling module 330 receives email metadata (e.g., sender, recipient, timestamps) and content (e.g., subject, body, attachments) data. Accordingly, in some embodiments, the AI modeling module 330 receives the previously collected customer message input data from a collected customer message input data 306, external data from an external information database 312.

Response generation module 320 is a server computer system that includes an AI model 326, an input assessment component 324, and a response component 328. The response generation module 320 receives customer emails form customer device 308. The administrator application 327 facilitates retrieval of the data from the user device 304 and its storage with data server 306. Additionally, response generation module 320 receives customer representative input data (e.g., CSR response to email) from the administrator application 327 associated with a CSR computing device 304.

Input assessment component 324 of response generation module 320 applies the model 326 (generated and trained by the AI modeling module 330 described above) and may perform one or more of the following processes. For example, the input assessment component 324 may analyze and interpret customer message input (e.g., a text message, a voice command, an email communication, a chat message, and so on) utilizing NLP to understand customer message input content and context, may convert spoken language into text for processing, may classify customer message input based on subject matter and urgency (e.g., identify keywords and phrases that indicate the urgency of the input), may classify emails based on subject matter and determines the appropriate response category, may extract and analyze any applicable behavior data, e.g., including keystroke rate (e.g., how fast the user is typing), time between keystrokes (e.g., words correlated with user's pausing may be indicative of anxiety). Further, the input assessment component 324 may analyze the emotional tone of the customer message based on the determined textual input and/or behavior data. In some embodiments, input assessment component 324 may assign a label to the message based on the emotional state. For example, a message from a user with highly negative emotional state (e.g., angry, highly irate) may be assigned a negative state label, a message from a user with a concerning emotional state that is less than negative (e.g., irritated but still polite) may be assigned a moderate state label, and a message from a user that does not express any negative or concerning emotions may be assigned or a neutral state label. In some embodiments, input assessment component 324 may determine urgency level associated with the customer's message. For example, a message assigned a negative state label may be tagged with a high level of urgency, a message assigned a moderate state label may be tagged with a medium level of urgency, and a message assigned a neutral state label may be tagged with a low level of urgency.

Input assessment component 324 communicates the input assessment to the response component 328, which in turn generates a response based on the input assessment and communicates to the administrator application 327. For example, messages tagged with high level of urgency may be routed to the customer service reps for immediate review. Messages tagged with medium level of urgency may be routed to the customer service reps for review within a certain time period (e.g., within 1 hour). In some embodiments, a draft response may be generated and may be utilized by the CSR, as explained below. Messages tagged with low level of urgency may be marked for automatic response without CSR review.

The response component 328 may construct coherent and contextually appropriate responses in natural language, convert text responses back into spoken language for auditory output, provide automated responses to common queries and gather initial information before routing to CSR, adapt responses to fit the specific context of the user query, monitor ongoing chats to provide real-time assistance to CSR if needed. In some embodiments, the response component 328 may utilize subject matter database 319 when generating a response. For example, subject matter database 319 may include data specific to the industry or business that the customer representatives support (e.g., mortgage loan information data). In some embodiments, the response component 328 may utilize knowledge base 311 when generating a response that requires outside knowledge. In some embodiments, response component 328 may take into account the emotional state of the user and utilize one or more empathetic features configured to improve the emotional state of the user. For example, if the user is agitated, a response configured to lower the agitation may include an acknowledgment of the problem and a resolution.

In some embodiments, the response component 328 may analyze past interactions with the customer to model user preferences and improve response accuracy and/or matching accuracy when routing the input to an expert (e.g., in the customer service scenario as described herein), and may match input with the most suitable expert based on expertise and availability.

In some embodiments, the customer message input database 306 may include a corpus of historical customer message input and interaction data associated with past interactions when system 100. In some embodiments, the customer message input database 306 may receive customer message input data from customer device 308. Customer message input data ingested from customer device 308 may be stored in the customer message input database 306 for further standardization resulting in generating a reduced set of records for use by the AI modeling module 330.

In some embodiments, the external information database 312 may include a plurality of records related to external data that may be used when analyzing customer message input, including social media activity data, such as sentiment of social media posts related to a subject of a customer message input, such as a company or its products (e.g., may assisted how an email is interpreted), trending topics or complaints on platforms like Twitter, Facebook, or LinkedIn (e.g., may help prioritize certain types of customer inquiries that are part of a larger trend), user's engagement with a company's social media accounts (e.g., can offer insights into their loyalty, level of satisfaction, or recent experiences), news articles or media reports mentioning a topic can affect customer sentiment and urgency (e.g., a negative news report might correlate with a spike in urgent or emotionally charged emails), broader industry news can also provide context for user inquiries (e.g., regulatory changes in the industry might lead to an increase in questions or concerns from customers), market data (e.g., stock price fluctuations can influence customer sentiment, especially among investors or stakeholders who might reach out via email), general economic conditions, such as recessions or booms, can impact the tone and urgency of customer communications, purchase or transaction history, website interaction data (e.g., time spent on support pages, items viewed or added to the cart), feedback, survey, and/or review data, geographic data (e.g., regional issues, such as natural disasters or local events, can affect the urgency and emotional tone of customer emails from those areas), time zone data (e.g., time zone differences can influence the perceived urgency of responses, especially for customers in different parts of the world), demographic data, including age, gender, and other demographic details can help personalize responses and prioritize certain user groups, and other such data.

In some embodiments, the external information database 312 may receive reference information from external systems (e.g., external systems 135 illustrated in FIG. 1), such as, e.g., social media platforms, news aggregators weather platforms, among others.

In some embodiments, a knowledge database 311 may include a plurality of records related to particular subject matter that may be accessed by the response component 328 when generating a response. For example, the knowledge base 311 may include relevant articles, FAQs, product information (e.g., detailed product specifications, user manuals, and installation guides, responses to common product-related queries, such as features, compatibility, and usage instructions, troubleshooting guides (e.g., product maps and documentation, step-by-step solutions for common issues customers might encounter, instructions for diagnosing and resolving problems without needing direct CSR intervention), policy and procedure details (e.g., company policies on returns, warranties, shipping, and billing, standard operating procedures for handling specific types of customer inquiries), service updates and announcements (e.g., information about new features, services, or updates, announcements regarding outages, maintenance schedules, or other service-related notices).

As used herein, a "database" refers to any suitable type of database or storage system for storing data. A database may include centralized storage devices, a distributed storage system, a blockchain network, and others, including a database managed by a database management system (DBMS). In some embodiments, an exemplary DBMS-managed database may be specifically programmed as an engine that controls organization, storage, management, or retrieval of data in the respective database. In some embodiments, the exemplary DBMS-managed database may be specifically programmed to provide the ability to query, backup and replicate, enforce rules, provide security, compute, perform change and access logging, or automate optimization. In some embodiments, the exemplary DBMS-managed database may be chosen from Oracle database, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, or objects. In some embodiments, the exemplary DBMS-managed database may be specifically programmed to include metadata about the data that is stored.

AI modeling module 330 receives collected user conversation data 306 that includes the following data, including, e.g., previously collected user query data and/or user interaction data, user profile data, including personal preferences, interaction history, and contextual information, user biometric identification (e.g., voice recognition, facial recognition) and contextual cues (e.g., location, device usage) to identify and differentiate between users, input metadata (e.g., timestamps, participant IDs) and content (e.g., messages, attachments) data, email metadata (e.g., sender, recipient, timestamps) and content (e.g., subject, body, attachments) data. AI modeling module 330 retrieves customer message input data from the customer message input database 306 and external information data from the external information database 312.

In some embodiments, user data is processed by the pre-processing component 314 which conditions any customer message input for optimum analysis, as described in detail below. Ensuring data is complete and devoid of any duplicate records ensures accurate analysis. For example, by utilizing the pre-processing component 314 (shown within AI modeling module 330) improves accuracy with respect to the application of AI model 326. The results of the -processing component 314 may be used by the NLP training component 313 to train language model 318. For example, training component 313 may use natural language processing (NLP) to perform analysis on processed customer message input. The NLP may be or include any kind of NLP engine, such as a general-purpose NLP engine (e.g., the Natural Language Toolkit (NLTK), spaCy, Stanford NLP, or OpenNLP), a domain-specific (e.g., prescription-specific) NLP engine, Lab NLP, or the Linguamatics), or a Large Language Model (LLM) of any kind(s).

In some embodiments, the pre-processing component 314 may transform the data, such as, e.g., customer message input (e.g., an email communication) by parsing into feature vectors or feature maps such that the NLP model component 318 may generate a data category determination. Next, the NLP model 318 may make category predictions based on features of the data.

Thus, in some embodiments, the pre-processing component 314 may receive the data, parse the data, and extract features according to a feature extraction algorithm. Data parsing and feature extraction may utilize methods depending on a type of data being received. For example, the pre-processing component 314 may include language parsing when the data includes text and character strings. Thus, in some embodiments, the pre-processing component 314 may include text recognition models including, e.g., a classifier for natural language recognition. However, in some embodiments, the data may be a table. In such a case, the pre-processing component 314 may simply extract features into, e.g., a feature vector directly from the data. However, in some embodiments, the data may include a combination of character strings, as well as structured data, such as tables, tuples, lists, arrays, among other. Thus, in some embodiments, the pre-processing component 314 may include model or algorithm for parsing the character strings and then extracting feature vectors from the structured data and the parsed character strings.

In some embodiments, the feature extraction algorithm may include, e.g., independent component analysis, an isomap, kernel principle component analysis (PCA), latent semantic analysis, partial least squares, principal component analysis, multifactor dimensionality reduction, nonlinear dimensionality reduction, multilinear PCA, multilinear subspace learning, semidefinite embedding, autoencoding, among others and combinations thereof. As a result, the pre-processing component 314 may capture the semantic meaning and context of the prescription information (i.e., information which may influence the content category or emotional state) by generating feature vectors having, e.g., text structure or text description, or frequency of certain words, among other possible features. For example, the textual component of the input may be converted into a feature vector using techniques such as Bag-of-Words (BoW), Term Frequency-Inverse Document Frequency (TF-IDF), or word embeddings (e.g., Word2Vec, GloVe).

In some embodiments, the NLP model 318 includes a number of text-based machine learning models to (i) predict emotional states directly from the words spoken by the user and (ii) model factors that correlate with such emotional states. Examples of machine learning that models emotional states directly include sentiment analysis, semantic analysis, language modeling, word/document embeddings and clustering, topic modeling, discourse analysis, syntactic analysis, and dialogue analysis. Models do not need to be constrained to one type of information. A model may contain information for example from both sentiment and topic based features. NLP information includes the score output of specific modules for example the score from a sentiment detector trained for sentiment rather than for emotional state. NLP information includes that obtained via transfer learning based systems.

NLP model 318 stores text metadata including, for example, data identifying, for each word or phrase, parts of speech (syntactic analysis), sentiment analysis, semantic analysis, topic analysis, etc. Modeling dynamics includes data representing components of constituent models of NLP model 318. Such components include machine learning features of NLP model 318 and other components such as long short-term memory (LSTM) units, gated recurrent units (GRUs), hidden Markov model (HMM), and sequence-to-sequence (seq2seq) translation information.

NLP training 313 uses the results of pre-processing component 314 to train NLP models 318. For example, NLP model training 313 includes syntactic language model training, semantic pattern model training, which include logic for training syntactic language model, semantic, respectively, of NLP training 318.

In some embodiments, descriptive features or descriptive analytics which include interpretable descriptions that may be computed based on features in the email and metadata that convey information about emotional state of the customer may be utilized. For example, descriptive features may include a customer feeling angry or anxious, for example, by using certain words or certain stylistic features. Certain features of email communication, such as lexical features (e.g., specific words or phrases often carry emotional weight such as "happy," "sad," "angry," etc.), syntactic features (e.g., complexity and structure of sentences can influence perceived sentiment), contextual features (e.g., meaning of words can change depending on the context (e.g., "great" in "not great" vs. "great job"), stylistic features (e.g., set of exclamation marks, question marks, and ellipses can convey different emotions), pragmatic features (e.g., understanding the intent behind the email (e.g., complaint, compliment, request) can provide insights into sentiment), semantic features (e.g., using techniques like word embeddings to capture the meaning of words in context, helping to understand the overall sentiment of the email), and discourse features (e.g., analyzing how sentences and paragraphs relate to each other to maintain the flow of sentiment throughout the email) can be used when determining emotional state of the customer. Machine learning models may make predictions by analyzing features.

In some embodiments, machine learning may use methods to process the features, and determine representations of those features, which may differ from how humans interpret them. Thus, labels that machine learning algorithms may "apply" to data, in the context of analyzing features, may not be labels that humans may be able to interpret.

AI model builder 332 uses the NLP model 318 in combination with external data 312 and subject matter data 319 to generate the AI model 326.

The models described herein may use confidence measures. A confidence measure may be a measure of how effective the score produced by the machine learning algorithm may be in order of accurately predicting emotional state of the customer, such as anger. In some embodiments, the confidence measure may be added to the score calculation, by weighting a calculated binary or scaled score with the confidence measure. In other embodiments, the confidence measure may be provided separately. For example, the system may tell a CSR that the customer has a 0.80 anger score with 75% confidence.

The confidence level may also be based on the quality of the labels of the training data used to train the models that analyze the content of customer's email message. For example, if the labels are based semantic content the confidence level of the score may be higher. Conversely, if the labels are based on stylistic features then the confidence level of the score may thus be lower. System may also use semantic analysis to find context clues to determine the identities of missing or unintelligible words.

In addition, the system may use user profiles to group people based on demeanor, ethnic background, gender, age, or other categories. Because people from similar groups may have similar semantic-based features, the system may be able to predict anger with higher confidence, as people who exhibit similar semantic-based features may indicate anger in similar manners.

In some embodiments, the AI model builder 332 may include, e.g., machine learning models, such as, e.g., one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

i) Define Neural Network architecture/model, ii) Transfer the input data to the exemplary neural network model, iii) Train the exemplary model incrementally, iv) determine the accuracy for a specific number of timesteps, v) apply the exemplary trained model to process the newly-received input data, vi) optionally and in parallel, continue to train the exemplary trained model with a predetermined periodicity.

The AI model training logic 334 can utilize a machine learning algorithm or other algorithm to construct and train AI model 326 to be used in the input assessment module 324, for example. The model 326 can be constructed to capture, based on the training data, the statistical relationship, if any, between a given feature value and customer message input being reviewed by the input assessment module 324. The model 326 may, for example, comprise the statistical correlations between a plurality of content characteristics, context characteristics, behavior characteristics, emotional state characteristics, urgency characteristics, and prescription information of one or more customer message input. A given feature value may have a different predictive utility for classifying each of the plurality of customer message inputs to be evaluated in the input assessment procedure.

One or more machine learning algorithms may be used to construct input assessment model, such as support vector machines that deploy stepwise backwards feature selection and/or graphical models, both of which can have advantages of inferring interactions between features. For example, machine learning algorithms or other statistical algorithms may be used, such as alternating decision trees (ADTree), Decision Stumps, functional trees (FT), logistic model trees (LMT), logistic regression, Random Forests, linear classifiers, or any machine learning algorithm or statistical algorithm known in the art. One or more algorithms may be used together to generate an ensemble method, wherein the ensemble method may be optimized using a machine learning ensemble meta-algorithm such as a boosting (e.g., AdaBoost, LPBoost, TotalBoost, BrownBoost, MadaBoost, LogitBoost, etc.) to reduce bias and/or variance. Once the AI model 326 is derived from the training data, the model may be used as a prediction tool to assess customer message input based on subject matter and urgency (e.g., identify keywords and phrases that indicate the urgency of the input), may classify emails based on subject matter and determines the appropriate response category, may extract and analyze any applicable behavior data, e.g., including keystroke rate (e.g., how fast the user is typing), time between keystrokes (e.g., words correlated with user's pausing may be indicative of anxiety). Further, the input assessment component 324 may analyze the emotional tone of the customer message based on the determined textual input and/or behavior data. Machine learning analyses may be performed using one or more of many programming languages and platforms known in the art, such as R, Weka, Python, and/or Matlab, for example.

A Random Forest classifier, which generally comprises a plurality of decision trees wherein the output prediction is the mode of the predicted classifications of the individual trees, can be helpful in reducing overfitting to training data. An ensemble of decision trees can be constructed using a random subset of features at each split or decision node. The Gini criterion may be employed to choose the best partition, wherein decision nodes having the lowest calculated Gini impurity index are selected. At prediction time, a "vote" can be taken over all of the decision trees, and the majority vote (or mode of the predicted classifications) can be output as the predicted classification.

Attention is now directed towards embodiments of user interfaces that can be implemented on, for example, client computing device 104.

Figure 4A:
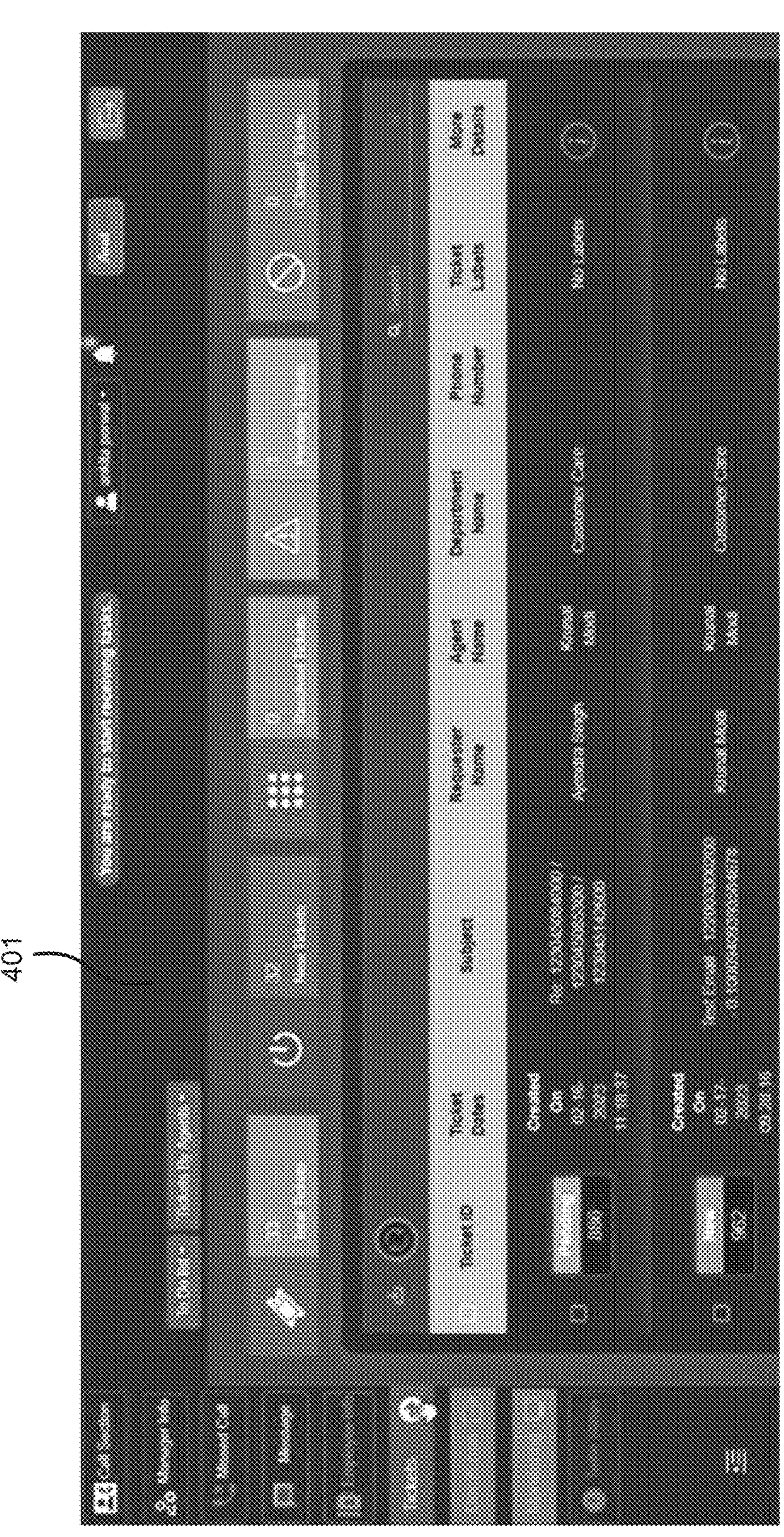
FIGS. 4A-4B illustrate exemplary user interfaces of the customer service email administrator system of FIG. 1, according to an implementation of the disclosure.
Figure 4B:
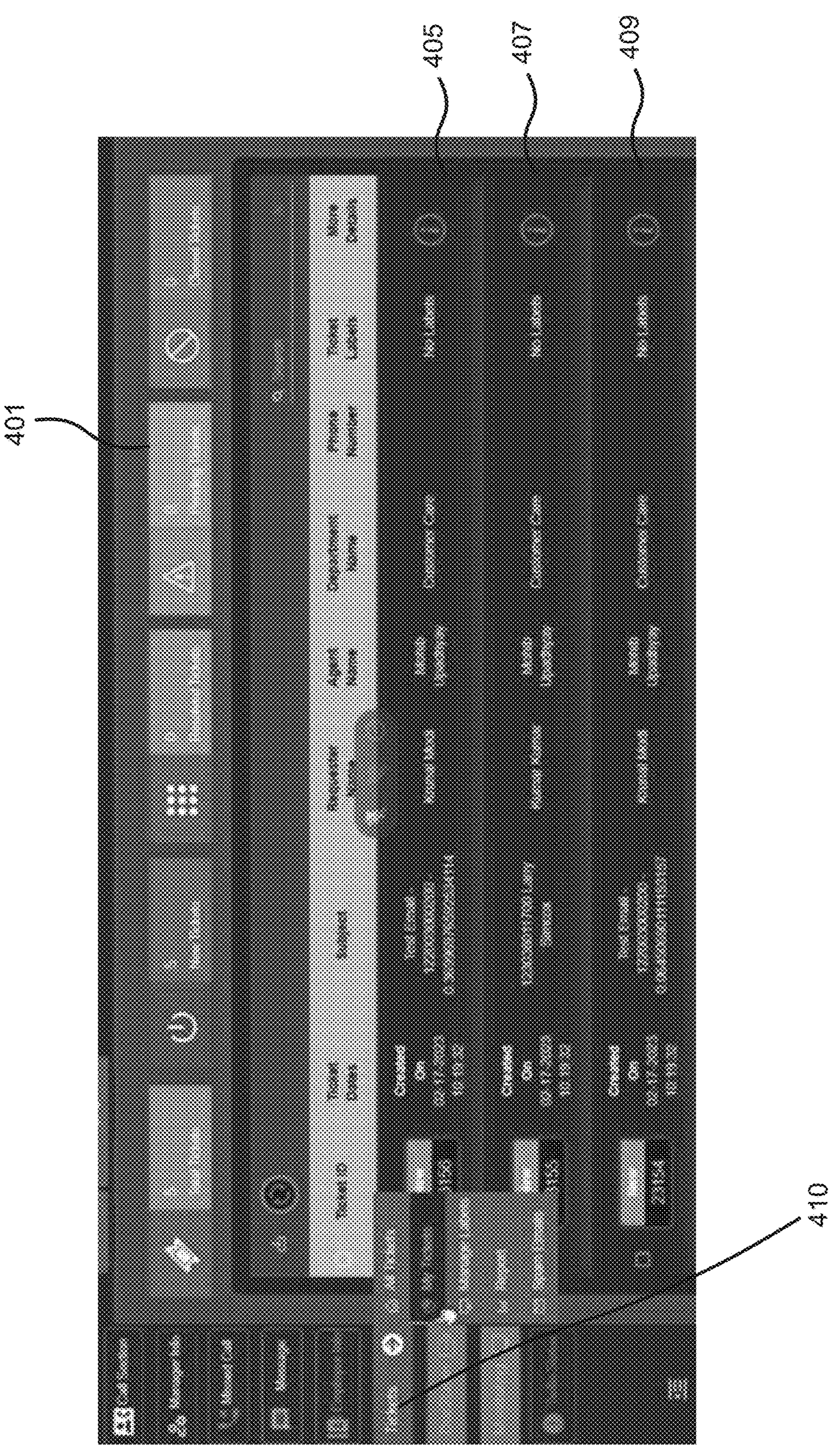
Figure 5:
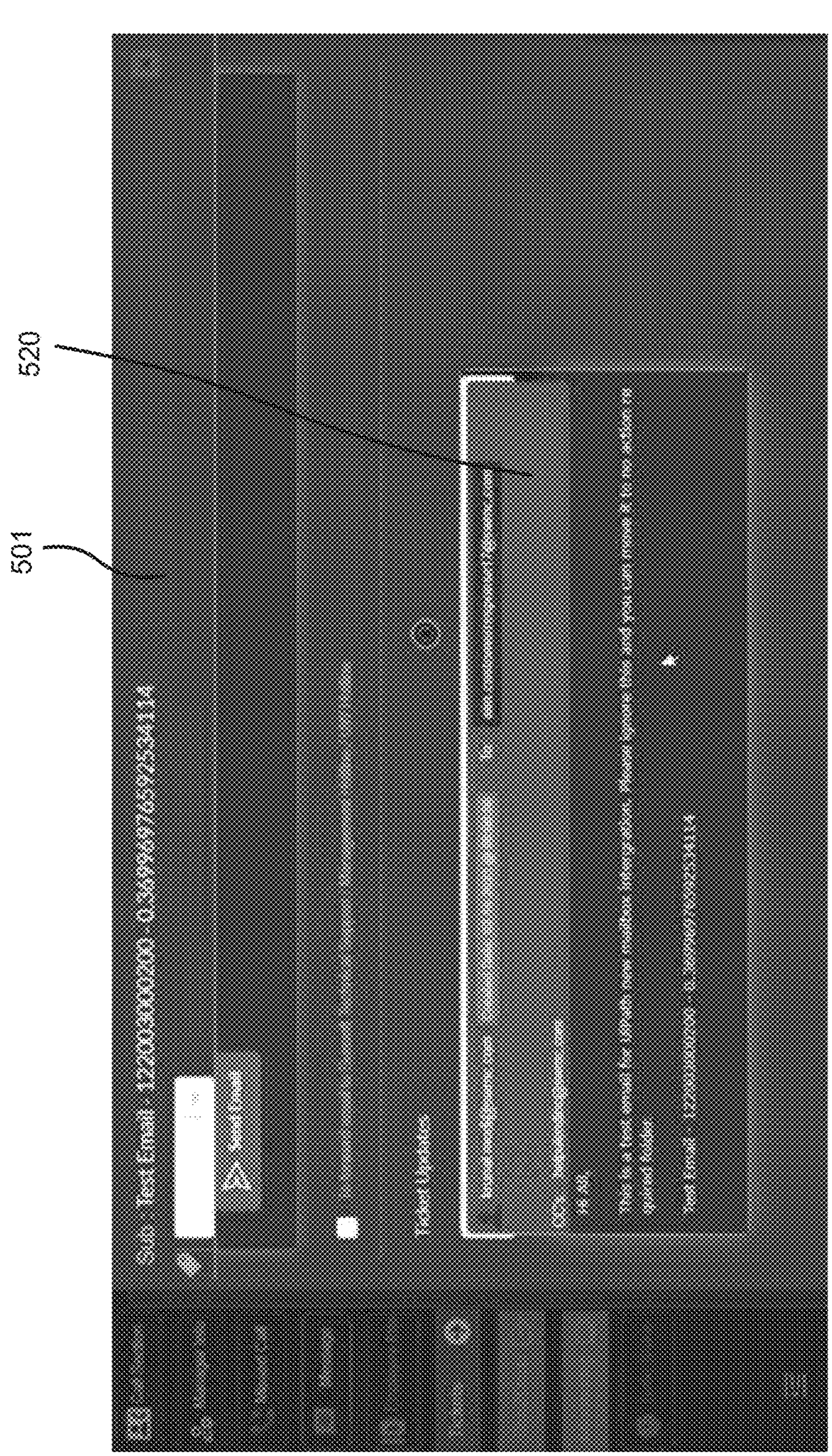
FIG. 5 illustrates an example email response generated by the customer service email administrator system of FIG. 1, according to an implementation of the disclosure.

FIGS. 4A-4B illustrate exemplary user interfaces for customer service email administrator application used by customer service representative on a client computing device 104, in accordance with some embodiments. As illustrated in FIG. 4A, customer service representative may view messages 405-407 that require their attention. As illustrated in FIG. 4B, customer service representative may access the messages 405-409 by selecting a tab 410 (e.g., tab "Tickets"). FIG. 5 illustrates an exemplary user interface 501 comprising an email response 515 generated by the system for customer representative review.

Figure 6A:
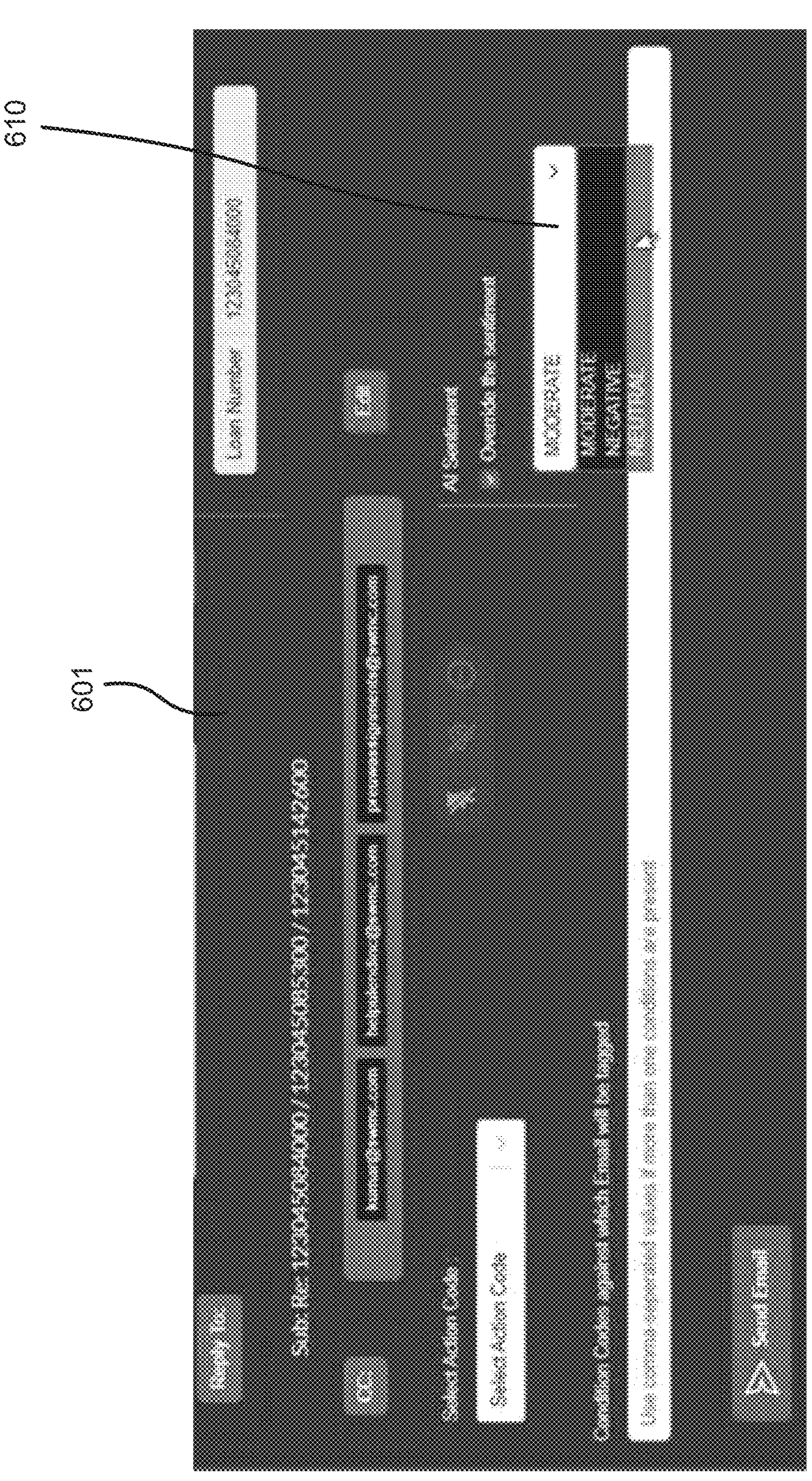
FIG. 6A illustrates an example sentiment override function, according to an implementation of the disclosure.

FIG. 6A illustrates an exemplary user interface 601 comprising an a sentiment override feature 620. As alluded to above, the component may receive the input from the input assessment component 324 including a high urgency level determination (e.g., in response to an emotional tone of the email exceeding a threshold). In response, component 328 may generate a communication to CSR alerting them of an email that requires immediate attention. In some embodiments, the response component 328 may generate a contextually appropriate draft responses in natural language which may take into consideration the level of sentiment contained in the email. This response may be utilized by the CSR upon review. Alternatively, the sentiment level may be overridden by the CSR. For example, as illustrated in FIG. 6, a CSR may utilize checkbox 620 to override the determined sentiment. The response component may utilize the override data and use it to train the AI module according to the error resulting from each sentiment level determination. In some embodiments, the response component may generate automated responses directly to clients. For example, upon determining that the emotional tone of the email is not exceeding a threshold, the response component may generate a coherent and contextually appropriate responses in natural language. In yet other embodiments, the response component may provide a response to common queries posed by the client. For example, the response component may first gather relevant data to include in the response. In some embodiments, the response component may utilize a knowledge base and a subject matter base (e.g., knowledge base 311 and subject matter base 319, as illustrated in FIG. 3) when generating a response that requires outside knowledge.

Figure 6B:
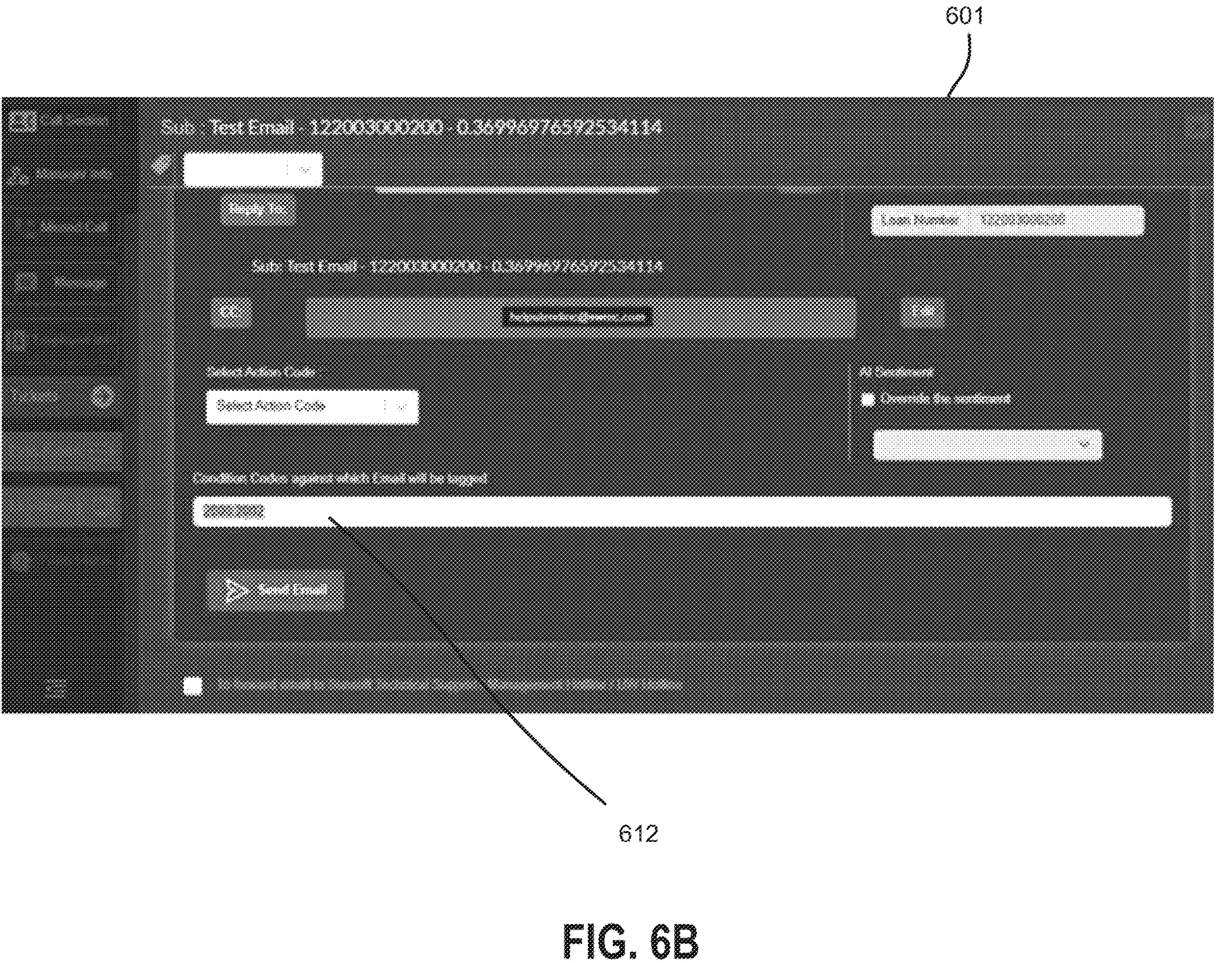
FIG. 6B illustrates an example condition code override function, according to an implementation of the disclosure.

In some embodiments, the system may associate a condition code based on the sentiment determination. For example, FIG. 6B illustrates an exemplary user interface 601 comprising an a condition code override feature 623.

Figure 7:
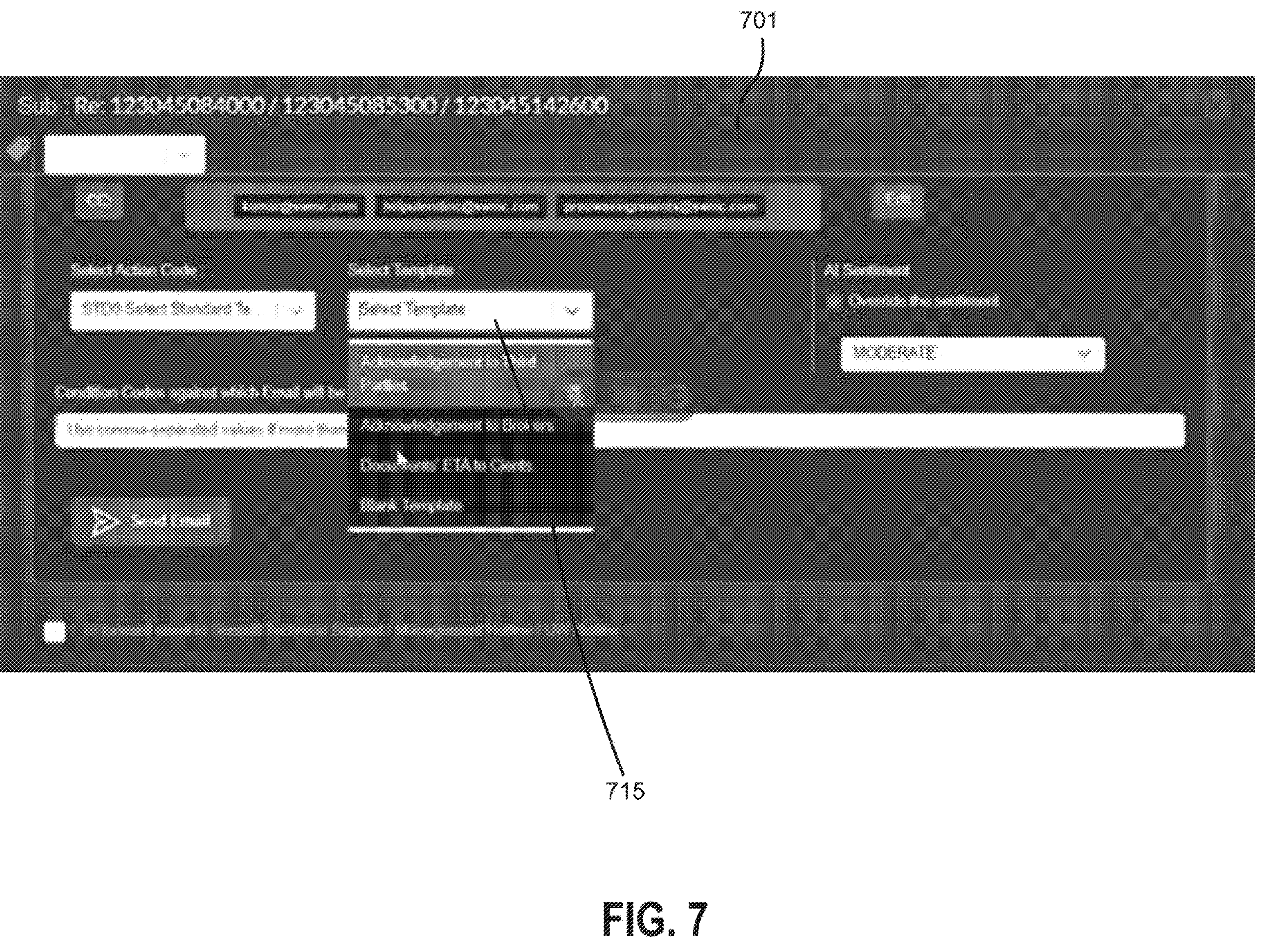
FIG. 7 illustrates an example template selection function, according to an implementation of the disclosure.

FIG. 7 illustrates an exemplary interface 701 for selecting a template for drafting a response template 725 by the customer service representative.

Figure 8:
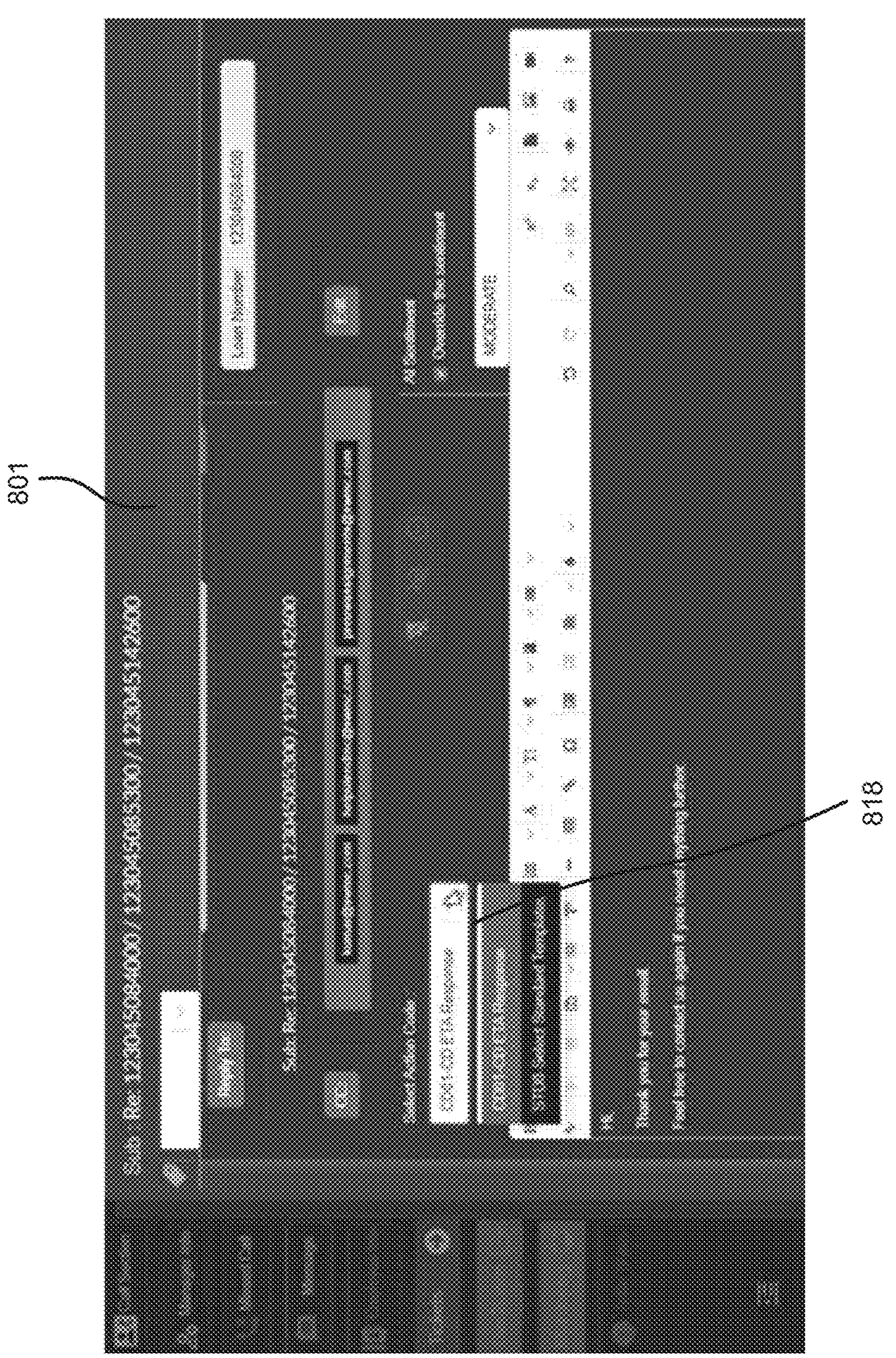
FIG. 8 illustrates an example action code selection function, according to an implementation of the disclosure.

FIG. 8 illustrates an exemplary interface 801 for selecting an action code 828 associated with an email response prepared by the customer service representative.

Figure 9:
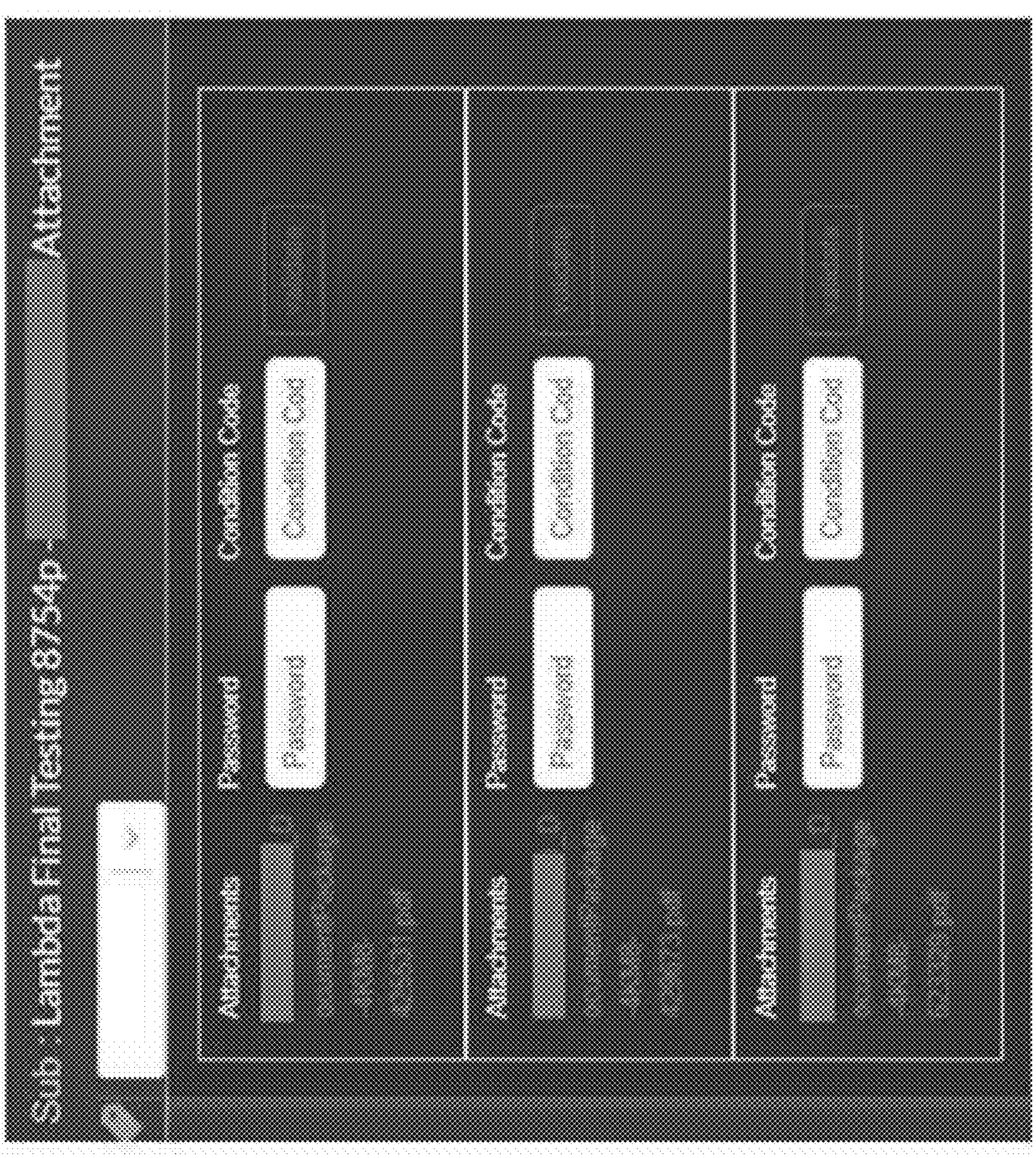
FIG. 9 illustrate exemplary user interface for downloading an email attachment, according to an implementation of the disclosure.
Figure 10:
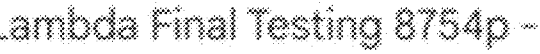
FIG. 10 illustrate example email received by the customer service email administrator system of FIG. 1, according to an implementation of the disclosure.
Figure 10:
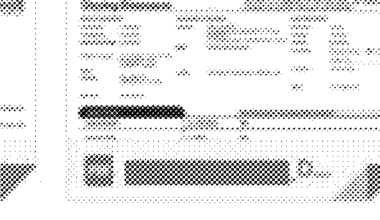
Figure 10:
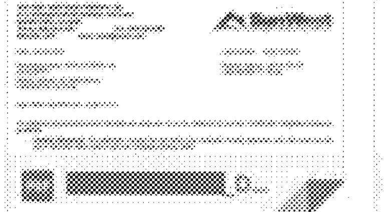
Figure 10:

FIG. 9 illustrates an exemplary interface 901 for downloading an email attachment 930 associated with an email received from a customer by the customer service representative. FIG. 10 illustrates an exemplary email 1005 received from a customer.

Figure 11:
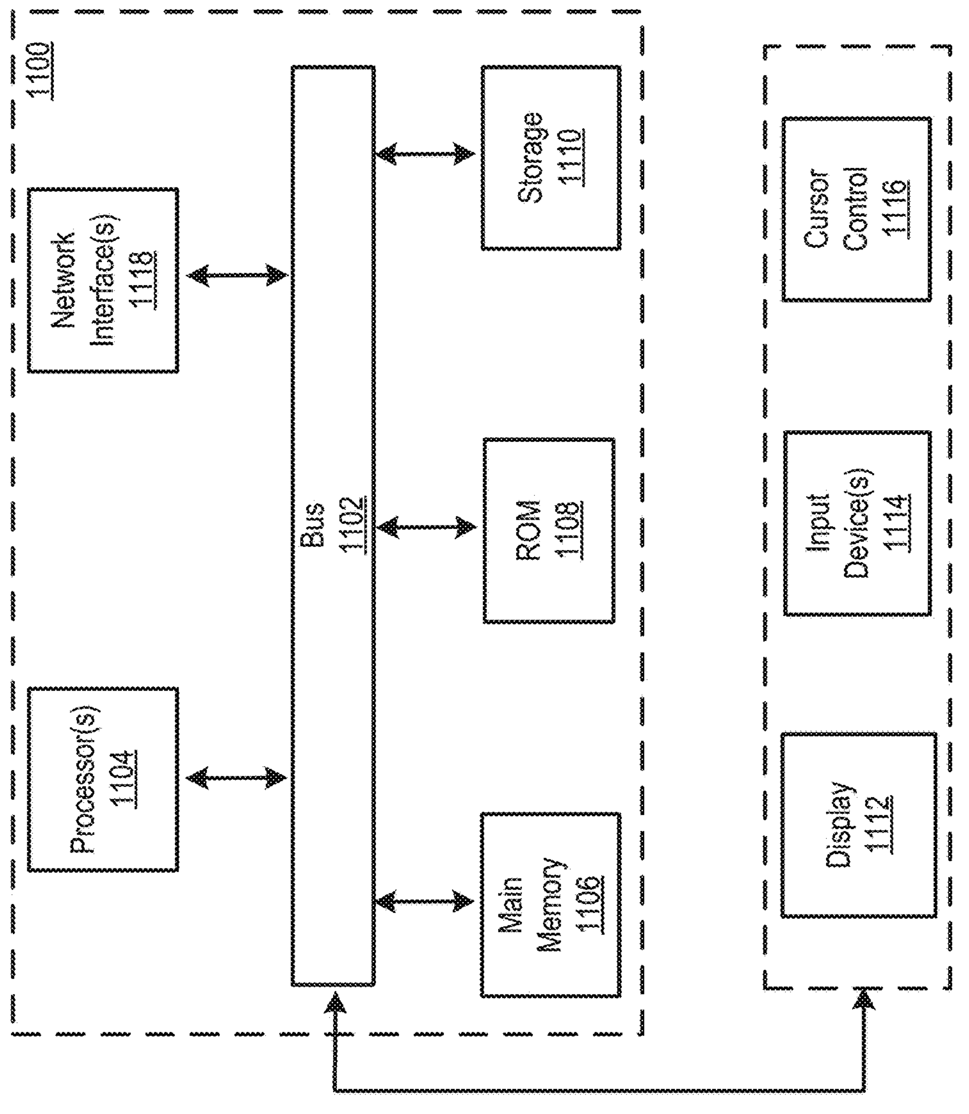
FIG. 11 illustrates an example computing system that may be used in implementing various features of embodiments of the disclosed technology.

FIG. 11 depicts a block diagram of an example computer system 1100 in which various of the embodiments described herein may be implemented. The computer system 1100 includes a bus 1102 or other communication mechanism for communicating information, one or more hardware processors 1104 coupled with bus 1102 for processing information. Hardware processor(s) 1104 may be, for example, one or more general purpose microprocessors.

The computer system 1100 also includes a main memory 1106, such as a random access memory (RAM), cache and/or other dynamic storage devices, coupled to bus 1102 for storing information and instructions to be executed by processor 1104. Main memory 1106 also may be used for storing temporary variables or other intermediate information during execution of instructions to be executed by processor 1104. Such instructions, when stored in storage media accessible to processor 1104, render computer system 1100 into a special-purpose machine that is customized to perform the operations specified in the instructions.

The computer system 1100 further includes a read only memory (ROM) 1106 or other static storage device coupled to bus 1102 for storing static information and instructions for processor 1104. A storage device 1110, such as a magnetic disk, optical disk, or USB thumb drive (Flash drive), etc., is provided and coupled to bus 1102 for storing information and instructions.

The computer system 1100 may be coupled via bus 1102 to a display 1112, such as a liquid crystal display (LCD) (or touch screen), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. In some embodiments, the same direction information and command selections as cursor control may be implemented via receiving touches on a touch screen without a cursor.

The computing system 1100 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, Javascript, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression, or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor(s) 1104 executing one or more sequences of one or more instructions contained in main memory 1106. Such instructions may be read into main memory 1106 from another storage medium, such as storage device 1110. Execution of the sequences of instructions contained in main memory 1106 causes processor(s) 1104 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1110. Volatile media includes dynamic memory, such as main memory 1106. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1102. Transmission media can also take the form of acoustic or light waves, such as those generated during radio-wave and infra-red data communications.

The computer system 1100 also includes a communication interface 1118 coupled to bus 1102. Network interface 1118 provides a two-way data communication coupling to one or more network links that are connected to one or more local networks. For example, communication interface 1118 may be an integrated services digital network (ISDN) card, cable modem, satellite modem, or a modem to provide a data communication connection to a corresponding type of telephone line. As another example, network interface 1118 may be a local area network (LAN) card to provide a data communication connection to a compatible LAN (or WAN component to communicate with a WAN). Wireless links may also be implemented. In any such implementation, network interface 1118 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 1118, which carry the digital data to and from computer system 1100, are example forms of transmission media.

The computer system 1100 can send messages and receive data, including program code, through the network(s), network link and communication interface 1118. In the Internet example, a server might transmit a requested code for an application program through the Internet, the ISP, the local network and the communication interface 1118.

The received code may be executed by processor 1104 as it is received, and/or stored in storage device 1110, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

In this document, the terms "computer program medium" and "computer usable medium" are used to generally refer to transitory or non-transitory media such as, for example, memory 1108, storage unit interface 420, media 1114, and channel 428. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1100 to perform features or functions of the present application as discussed herein.

Various embodiments have been described with reference to specific exemplary features thereof. It will, however, be evident that various modifications and changes may be made thereto without departing from the broader spirit and scope of the various embodiments as set forth in the appended claims. The specification and figures are, accordingly, to be regarded in an illustrative rather than a restrictive sense.

Although described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment. Thus, the breadth and scope of the present application should not be limited by any of the above-described exemplary embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method for automatically routing customer messages, the method comprising:

receiving a customer message sent by a user;

analyzing the customer message using an NLP module to determine a subject of the customer message and assessing emotional state of the user by generating an emotional tone score and comparing the emotional tone score to a threshold;

assigning an urgency level based on the NLP module analysis including, when the emotional tone score exceeds the threshold, generating an alert to a customer service representative (CSR);

selecting an action in response to the urgency level, wherein: (i) for a high urgency level the action includes routing the customer message to the CSR and generating a draft response for CSR review, (ii) for a low urgency level the action includes generating an automated response, and (iii) generating the draft response or the automated response includes gathering data from at least one of a knowledge base, a subject matter base, or an external information database; and receiving, via a user interface, an override input from the CSR that overrides an automatically determined sentiment, and training an AI model based on the override input.

2. The method of claim 1, wherein the customer message comprises at least one conversational-style input sent by the user.

3. The method of claim 1, wherein the at least one conversational-style input sent by the user comprises text data.

4. The method of claim 1, wherein the NLP module comprises one or more deep learning systems applied to the at least one conversational-style input to extract feature representations from the at least one conversational-style input, wherein the feature representations comprise one or more language features.

5. The method of claim 1, wherein the NLP module comprises one or more machine learning models to assess emotional state of the user based at least on the feature representations and generate a prediction confidence of the emotional state, wherein the one or more machine learning models comprise at least one of an or a natural language processing (NLP) model.

6. The method of claim 1, wherein the assessed emotional state comprises a negative state, a moderate state, or a neutral state.

7. The method of claim 6, wherein the urgency level comprises a high level, a medium level, or a low level.

8. The method of claim 5, wherein the negative emotional state corresponds to the high urgency level; the moderate emotional state corresponds to the medium urgency level; and a neutral emotional state corresponds to the low urgency level.

9. The method of claim 8, wherein the action comprises routing the customer message to a representative, generating a response for review, or generating an automatic response.

10. The method of claim 9, wherein the high urgency level corresponds to routing the customer message to a representative; the medium urgency level corresponds to generating the response for review; and the low urgency level corresponds to generating the automatic response.

11. The method of claim 10, wherein generating the response for review is based on the emotional state of the user.

12. A system for automatically routing customer messages, the system comprising:

one or more computing processors; and a machine-readable storage medium storing instructions that, when executed by the one or more processors, cause the system to:

receive a customer message sent by a user;

analyze the customer message using an NLP module to determine a subject of the customer message and assessing emotional state of the user by generating an emotional tone score and comparing the emotional tone score to a threshold;

assign an urgency level based on the NLP module analysis including, when the emotional tone score exceeds the threshold, generating an alert to a customer service representative (CSR);

select an action in response to the urgency level, wherein: (i) for a high urgency level the action includes routing the customer message to the CSR and generating a draft response for CSR review, (ii) for a low urgency level the action includes generating an automated response, and (iii) generating the draft response or the automated response includes gathering data from at least one of a knowledge base, a subject matter base, or an external information database; and receiving, via a user interface, an override input from the CSR that overrides an automatically determined sentiment, and training an AI model based on the override input.

13. The system of claim 12, wherein the customer message comprises at least one conversational-style input sent by the user.

14. The system of claim 13, wherein the at least one conversational-style input sent by the user comprises text data.

15. The system of claim 13, wherein the NLP module comprises one or more deep learning systems applied to the at least one conversational-style input to extract feature representations from the at least one conversational-style input, wherein the feature representations comprise one or more language features.

16. The system of claim 15, wherein the NLP module comprises one or more machine learning models to assess emotional state of the user based at least on the feature representations and generate a prediction confidence of the emotional state, wherein the one or more machine learning models comprise at least one of an or a natural language processing (NLP) model.

17. The system of claim 16, wherein the assessed emotional state comprises a negative state, a moderate state, or a neutral state.

18. The system of claim 17, wherein the urgency level comprises a high level, a medium level, or a low level.

19. The system of claim 18, wherein the action comprises routing the customer message to a representative, generating a response for review, or generating an automatic response.

20. The system of claim 19, wherein the high urgency level corresponds to routing the customer message to a representative; the medium urgency level corresponds to generating the response for review; and the low urgency level corresponds to generating the automatic response.

21. The system of claim 20, wherein generating the response for review is based on the emotional state of the user.

* * * * *